United States Patent [19]

Holz

[11] 4,107,033
[45] Aug. 15, 1978

[54] APPARATUS FOR CLEANING FIBROUS SUSPENSIONS OF LOW STOCK CONSISTENCY

[75] Inventor: Emil Holz, Eningen/u.A., Fed. Rep. of Germany

[73] Assignee: Hermann Finckh Maschinenfabrik, Fed. Rep. of Germany

[21] Appl. No.: 777,065

[22] Filed: Mar. 14, 1977

[30] Foreign Application Priority Data

Mar. 20, 1976 [DE] Fed. Rep. of Germany ....... 2611885

[51] Int. Cl.² .............................................. B04C 9/00
[52] U.S. Cl. ..................................... 209/17; 209/211; 209/273
[58] Field of Search ................. 209/17, 211, 250, 273, 209/305, 306; 210/84, 512 R, 298, 304

[56] References Cited

U.S. PATENT DOCUMENTS

| 2,377,524 | 6/1945 | Samson et al. | 209/211 |
| 2,701,642 | 2/1955 | Goodwin | 209/211 |
| 3,172,844 | 3/1965 | Kurz | 209/211 |
| 3,276,583 | 10/1966 | Carr | 209/211 |
| 3,964,996 | 6/1976 | Holz et al. | 209/17 |

FOREIGN PATENT DOCUMENTS

| 1,461,090 | 10/1970 | Fed. Rep. of Germany | 209/17 |
| 327,129 | 8/1970 | Sweden | 210/512 R |

Primary Examiner—Frank W. Lutter
Assistant Examiner—Ralph J. Hill
Attorney, Agent, or Firm—Leydig, Voit, Osann, Mayer & Holt, Ltd.

[57] ABSTRACT

An apparatus for cleaning fibrous suspensions of low stock consistency comprising, in combination, a specially adapted vortex cleaner and pressure screen. The vortex cleaner has a cone angle of less than 20°, between 7° and 15° in a preferred embodiment, to increase the residence time therein. The pressure screen comprises a rotor having a lower surface with acceleration elements to set the suspension in motion within the vortex cleaner while effectively sealing the space between a stationary screen basket and the rotor of the pressure screen to prevent short-circuiting of the fibrous suspension directly from the vortex cleaner inlet into the pressure screen. The rotor has a central opening in the lower surface thereof to accept the suspension leaving the vortex cleaner and further comprises peripheral openings in flow communication with this central opening through which the suspension passes to enter the annular space between the rotor and the screen basket.

10 Claims, 4 Drawing Figures

APPARATUS FOR CLEANING FIBROUS SUSPENSIONS OF LOW STOCK CONSISTENCY

This invention relates to an apparatus for cleaning fibrous suspensions of low stock consistency. As used herein, "low stock consistency" is employed to describe a stock density range between about 0.8% and 1.5% as contrasted with "high stock consistency" wherein the stock density range is normally between 2.5% and 5.0%. Such apparatus used in the so-called low consistency range are also known as cleaners or low consistency cleaners. The separation of specific heavy particles and specific light components of relatively large size from fibrous suspensions of relatively low stock density is usually carried out with pipe centrifuges, herein also sometimes referred to as vortex cleaners, comprising a downwardly tapering conical casing with a dirt outlet at the lower end and an inlet for the suspension to be cleaned at the upper end. This inlet is in the form of a tangentially discharging pipe nozzle, and as the suspension to be cleaned is fed into known vortex cleaners with a feed pressure of 3 to 4.5 Kg/cm$^2$, a flow is set up which because of the tangential direction of the inlet nozzle to the vortex cleaner is shaped externally in the form of a downward spiral, and is directed upwardly in the centre, so that the dirt may be drawn off at the bottom and the clean suspension at the top.

In order to be able to effectively separate the dirt when working in the low consistency region, a considerable circulation speed in the vortex cleaner and a correspondingly high feed pressure in the said range are necessary for the suspension to be cleaned, so that considerable energy is required for the operation of known vortex cleaners. Accordingly, a primary object of the invention is to construct an apparatus for cleaning fibrous suspensions of low stock consistency which is of lower energy consumption. As an additional cleaning step, in the case of repulping fibre suspensions obtained from waste paper, the fibrous suspension cleaned in a vortex cleaner is fed to a pressure screen for pre-screening in the low consistency range, and the same applies to fine screening in the high consistency range. In this regard, another object of the present invention is to provide a combination vortex cleaner and pressure screen which saves a large part of the energy necessary for producing a high feed pressure for the operation of the vortex cleaner by producing the necessary circumferential speed of the fibrous suspension to be cleaned in the vortex cleaner with a rotor in the form of a component part of the pressure screen combined with the vortex cleaner.

The stated object maybe attained by using an apparatus such as that proposed in U.S. Pat. No. 3,964,996, i.e. a vortex cleaner with an incorporated pressure screen for fibrous suspensions. In such an apparatus the vortex cleaner comprises a downwardly tapering conical housing with a dirt outlet at the lower end and an inlet for the suspension to be cleaned at the upper end, and the pressure screen comprises a stationary cylindrical upright screen basket concentric to the vortex cleaner axis with a driven rotor therein. The rotor is provided on its underside with acceleration elements to improve the circulation of the suspension flowing into the vortex cleaner. The apparatus disclosed in the above application, however, is not suitable for use in the low consistency range substantially for the following reasons, namely that the fibrous suspension leaving the vortex cleaner flows from below into an annular clearance between the lowerly closed rotor and the screen basket of the pressure screen, and if this apparatus is used in the low consistency range a considerable portion of the fibrous suspension to be cleaned flows directly into this annular clearance from the inlet, a problem not encountered in processing suspensions of high stock density.

According to the present invention, the apparatus disclosed in the referenced patent is modified for use in the low consistency range in such a manner that the rotor comprises a central inlet opening on its lower side, with the remainder closed. In addition a clearance seal is provided for the annular clearance between the lower side of the rotor and the screen basket.

In this manner, the suspension fed to the vortex cleaner to be cleaned firstly flows completely through the vortex cleaner from top to bottom, whereby dirt particles of correspondingly high specific gravity and relatively large dirt particles of relatively low specific gravity are separated out, so that they may be drawn off at the lower end of the vortex cleaner, the cleaned suspension flowing through the vortex cleaner at its centre from the bottom upwards and entering the center of the rotor at its lower side. The suspension then leaves the rotor through suitable openings in the rotor casing, and the so-called "accepted" stock may be drawn off from the space surrounding the screen basket, while the so-called "rejected" stock flows upwards in the annular clearance between the rotor and screen basket and is drawn off at the top. As the inlet opening on the lower side of the rotor has a substantially smaller diameter than the rotor itself, there remains sufficient room on the lower side of the rotor for the acceleration elements by which the fibrous suspension entering the vortex cleaner is set into circulation when the rotor runs at high speed.

The known apparatus consisting of a pressure screen and vortex cleaner employed acceleration elements on the lower side of the rotor in the form of strips extending in a radial direction from the centre of the rotor to its periphery precluding an opening at the bottom of the rotor to provide an inlet rotor for the suspension entering the pressure screen portion.

Further the known apparatus, the cone angle of the vortex cleaner housing is approximately 35°. According to one aspect of the present invention, however, use in the low consistency range, it is recommended that the cone angle of the vortex cleaner be chosen less than approximately 20°, and preferably equal to or less than 15° and in particular between about 7° and 15°. Because of the greater length of the vortex cleaner given the same diameter at the inlet (the length is preferably approximtely five times the housing diameter at the upper end of the vortex cleaner) a substantially higher cleaning efficiency is obtained because a longer retention time is available for the separation of the dirt, bark and other particles such as wood splinters, as the fibrous suspension to be cleaned circulates in the vortex cleaner.

In order to guarantee that only the cleaned portion of fibrous suspension flows into the pressure screen, it is recommended that the diameter of the inlet opening in the rotor be somewhat smaller than the diameter of the upward flowing stream at the centre of the vortex cleaner.

Sharp edges and small openings always give rise to the danger of fibre build-up, leading to operational disturbance. Thus a preferred embodiment of the apparatus according to the invention comprises only two outlet openings in the rotor casing, i.e. the rotor comprises a closed casing with the exception of two outlet openings. It is particularly advantegeous if a T pipe piece is disposed in the rotor to form the inlet opening and outlet openings, as in this manner fibre agglomerations can be prevented in the interior of the rotor.

Further characteristics, details and advantages of the invention are evident from the accompanying claims and/or the following description and the accompanying drawing of a preferred embodiment of the apparatus according to the invention, wherein:

Figure 1:
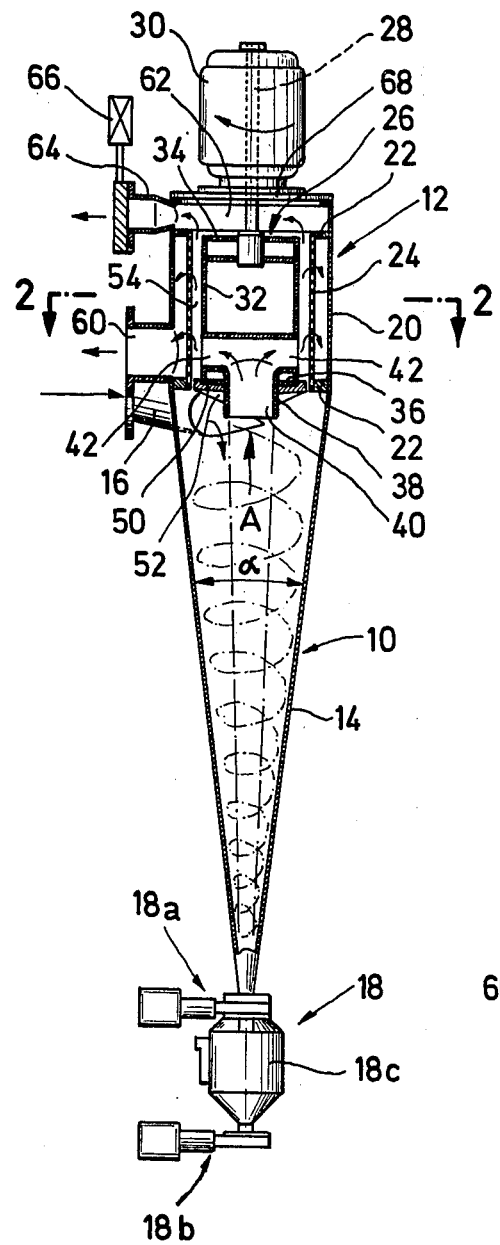
FIG. 1 is an axial section through a first embodiment of the apparatus according to the invention.
Figure 2:
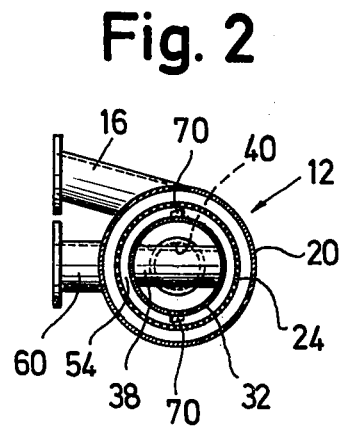
FIG. 2 is a section through this apparatus on the line 2—2 of FIG. 1.
Figure 3:
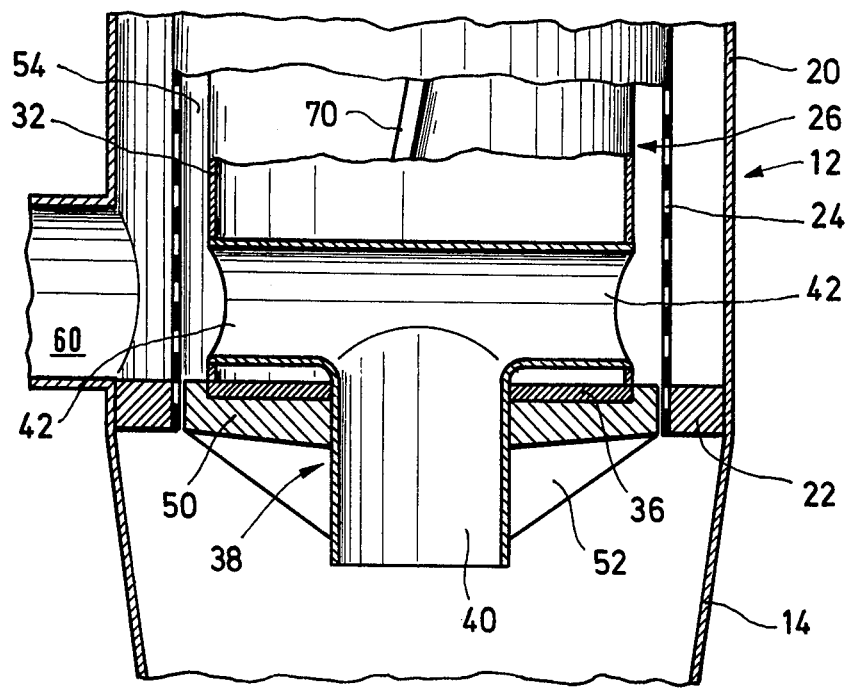
FIG. 3 is a view of the portion indicated in FIG. 1 with A but to a larger scale.

The apparatus shown in FIGS. 1 to 3 consists of a vortex cleaner 10 and a pressure screen 12, this latter being mounted on the top of the vortex cleaner. This comprises a conical housing 14 with an upper inlet in the form of a tangentially discharging pipe nozzle 16 and a lower dirt lock 18 shown overall by the reference numeral 18.

This latter is of known construction and comprises two pneumatic gate valves 18a and 18b, between which a dirt container 18c is disposed. This dirt lock allows discontinuous dirt discharge, for which firstly the gate valve 18a is opened, so that the dirt collected in the vortex cleaner housing 14 can fall downwards into the dirt container 18c. The valve 18a is then closed and the valve 18b opened, in order to empty the dirt container.

The pressure screen 12 comprises a cylindrical housing 20 in which a likewise cylindrical screen basket 24 is held between rings 22. A rotor indicated overall by the reference numeral 26 rotates in this screen basket, and is held by the drive shaft 28 of an electric motor 30 mounted on the housing 20. It is of substantially circular cylindrical shape with a circular cylindrical casing 32, a cover 34 closing the top of the rotor and a circular ring shaped base 36 in which a T pipe piece 38 is inserted, to define an inlet opening 40 on the lower side of the rotor and two opposing outlet openings 42 at the periphery, and, according to the invention, rounded transitions between the channel leading from the inlet opening 40 upwards and the transverse channel joining the outlet openings 42.

A support ring 50 is fixed to the base 36 of the rotor, its downward facing surface being of truncated conical shape and carrying radially extending acceleration strips 52 which, as shown in FIG. 1, are of approximately triangular shape. As shown in FIG. 3, the annular clearance or annular space 54 between the casing 32 of the rotor and the screen basket 24 is nearly closed lowerly by a clearance seal formed by the support ring 50, so that an interspace exists between the periphery of the support ring 50 and the screen basket 24 which is just wide enough for the dirt particles contained in the fibrous suspension leaving the vortex cleaner 10 not to give too much abrasion should they enter this annular space.

A pipe nozzle forming an accepted stock outlet 60 is welded external to the screen basket 24, and a pipe nozzle 64 opens into a rejected stock compartment 64 of the pressure screen 12 above the rotor 26, and is closed with a pneumatically operated gate valve 66.

Finally, the cover supporting the electric motor 30 and closing the top of the pressure screen housing is indicated by 68.

The fibrous suspension to be cleaned and screened is fed through the pipe nozzle 16 forming an inlet into the vortex cleaner 10, whereby, because of the tangential arrangement of the pipe nozzle 16 and in particular because of the high rotational speed of the rotor 26 and correspondingly of the acceleration strips 52, the fibrous suspension is set into strong circulation in the vortex cleaner. This sets up a downward spiral flow in the vortex cleaner, the result of which is that specific heavy dirt particles and specific relatively light dirt particles above a given lower size limit collect in the outer region of the vortex cleaner and deposit in its lower end, so that they can be drawn off through the dirt lock 18. The cleaned fibrous suspension rises upwards in the centre of the vortex cleaner 10 and enters the rotor 26 through the inlet opening 40 and then enters the pressure screen 12.

Most of the water of the fibrous suspension, together with the useful fibre portion, passes through the screen basket 24 and leaves through the accepeted stock outlet 60 of the apparatus, while the so-called rejected stock flows upwards into the rejected stock compartment 62 through the annular space 54 and from there may be either continuously or discontinuously drawn off through the pipe nozzle 64.

As the housing 14 of the vortex cleaner 10 has a relatively small cone angle and therefore a long length, even fibrous suspensions in the low consistency range may be properly cleaned, if the speed of the rotor 26 is sufficiently high, without a high feed pressure being necessary at the pipe nozzle 16. It is advantageous if the diameter of the inlet opening 40 is somewhat smaller than the diameter of the upwardly directed stream in the centre of the vortex cleaner 10, to ensure that only those portions of the fibrous suspension which are substantially free from dirt particles can enter the rotor. It is also desirable from the point of view of cleaning efficiency if the T pipe piece 38 projects downwards as far as the region where the pipe nozzle 16 opens into the vortex cleaner 10.

It is also desirable for the rotor 26 to be provided at its periphery with projections, and in particular with clearance strips 70 as shown in FIG. 2, which are slightly inclined to the axial direction of the rotor to such an extent that they provide a conveying effect upwards for the appropriate direction of rotation of the rotor. It is also the purpose of the clearance strips 70 to provide pressure pulses on the openings of the screen basket 24, so as to prevent in known manner, the accumulation of the fibrous material in the screen openings. A spacing of between 10 mm and 30 mm between the cleaned strips 70 and the screen basket 24 has been shown to give satisfactory results.

A particularly effective cleaning of the fibrous suspension in the vortex cleaner 10 is obtained if the peripheral speed of the rotor is between 20 and 25 m/sec. and in particular about 23 m/sec.

In the preferred embodiment of the apparatus according to the invention, the length of the vortex cleaner is approximately five times its diameter at the upper end, and the distance between the clearance strips 70 and the screen basket 24 is about 20 mm. The diameter of the rotor inlet opening 40 is approximately the same as the diameter of the pipe nozzle 16, i.e. of the inlet for the suspension to be cleaned, and approximately 30% of the diameter of the pipe centrifuge at its upper end.

Figure 4:
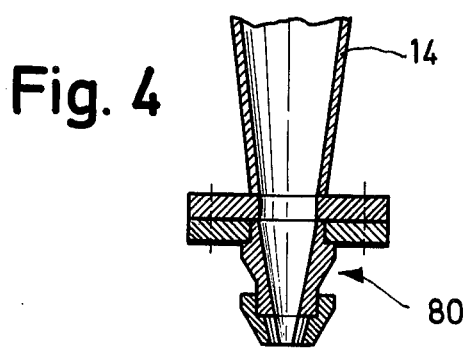
FIG. 4 is a section through the lower part of a second embodiment of the apparatus according to the invention.

FIG. 4 shows a modification of the lower end of the vortex cleaner 10. Instead of the dirt lock 18 with the discontinuous discharge of dirt, there is a special replaceable nozzle 80 through which the dirt flows continuously with accompanying water. The opening in the nozzle is desirably so chosen that 0.5 to 1% of the circulating fibrous suspension is continuously drawn off through the nozzle.

I claim:

1. In an apparatus particularly suited for cleaning and sorting fibrous suspensions having a low stock consistency, the combination comprising:
   a vortex cleaner having a downwardly tapering conical housing with an inlet for the suspension to be cleaned at the upper end and an outlet for the dirt particles removed at the lower end;
   a pressure screen mounted to the upper end of the vortex cleaner housing, said pressure screen having a stationary and cylindric upright screen basket, a driven rotor within said screen basket, the axes of the screen basket and of the rotor being concentric with said vortex cleaner housing, said rotor having a lower surface with a central opening therein and means to promote the circulation of the suspension flowing into the vortex cleaner, said rotor forming an annular clearance with said screen basket and sealing means for closing the annular clearance between the rotor and the screen basket such that substantially none of said suspension entering said vortex cleaner passes upwardly between said screen basket and said rotor and substantially all of the cleaned suspension leaving said vortex cleaner passes upwardly through the central opening in said lower rotor surface, said central opening comprising means for delivering said cleaned suspension leaving said vortex cleaner to said annular clearance.

2. In the apparatus of claim 1, the cone angle of said vortex cleaner housing being less than 20°.

3. In the apparatus of claim 2, the cone angle of said vortex cleaner housing being between 7° and 15°.

4. In the apparatus of claim 1, said rotor further comprising a cylinder projecting downwardly from the central opening in said lower rotor surface, said cylinder extending as far downward as said inlet into said vortex cleaner housing.

5. In the apparatus of claim 1, said rotor further comprising a circumferential wall having at least one outlet opening therein.

6. In the apparatus of claim 5, said rotor having two outlet openings in said circumferential wall and a T-shaped element connecting the central opening in said lower rotor surface with said two outlet openings.

7. In the apparatus of claim 1, said rotor further comprising projections extending substantially axially and spaced apart from said screen basket between 10 and 30 mm.

8. In the apparatus of claim 7, said spacing between said projections and said screen basket being substantially 20 mm.

9. In the apparatus of claim 1, the diameter of said central opening in the lower rotor surface being substantially 30% of the diameter of the upper end of said vortex cleaner housing.

10. In the apparatus of claim 1, the diameter of the central opening of said lower rotor surface being substantially the same as the diameter of said inlet to said vortex cleaner.

* * * * *